United States Patent [19]

Nakamura et al.

[11] Patent Number: 5,486,075
[45] Date of Patent: Jan. 23, 1996

[54] BORING TOOL

[75] Inventors: Shinichi Nakamura; Takashi Kubota, both of Gifu, Japan

[73] Assignee: Mitsubishi Materials Corporation, Tokyo, Japan

[21] Appl. No.: 280,876

[22] Filed: Jul. 27, 1994

[30] Foreign Application Priority Data

Jul. 27, 1993 [JP] Japan .................. 5-185314
Jul. 27, 1993 [JP] Japan .................. 5-185315

[51] Int. Cl.$^6$ .................................. B23B 51/02
[52] U.S. Cl. .................. 408/230; 408/224
[58] Field of Search ................... 408/224, 225, 408/227, 229, 230

[56] References Cited

U.S. PATENT DOCUMENTS

| 2,370,706 | 3/1945 | Andreasson | 408/230 |
| 3,598,500 | 8/1971 | Oxford, Jr. | 408/210 |
| 3,977,807 | 8/1976 | Siddall | 408/230 |

FOREIGN PATENT DOCUMENTS

| 764041 | 4/1934 | France | 408/230 |
| 3325149 | 1/1985 | Germany | 408/227 |
| 245914 | 11/1991 | Japan | 408/224 |
| 562389 | 6/1977 | U.S.S.R. | 408/230 |

*Primary Examiner*—Daniel W. Howell
*Attorney, Agent, or Firm*—Armstrong, Westerman, Hattori, McLeland & Naughton

[57] ABSTRACT

A boring tool having a tool body (10) which has a pair of chip discharge flutes (11) formed in the peripheral surface thereof. A cutting edge (13) is formed on the edge line where the end relief surface of the tool body intersects the wall surface of each chip discharge flute which faces forwardly as viewed in the direction of the tool rotation. A first margin (15) is provided on the end of the land which is on the trailing side of the flute (11) as viewed in the tool rotation direction, while a second margin (17) is provided on the end of the land adjacent to the heel (16). The lands are provided with recesses (20) in the depths of each of which progressively increase from the first margin towards the second margin. A sub cutting edge (21) is formed on the edge line where the end relief surface meets the wall surface of the recess (20) which faces forwardly as viewed in the direction of the tool rotation.

19 Claims, 14 Drawing Sheets

5,486,075

BORING TOOL

BACKGROUND OF THE INVENTION

1. Field of the Invention

The present invention relates to a boring tool such as a drill and, more particularly, to an improvement in a cutting tool suitable for use in the boring of aluminum castings.

2. Description of the Related Art and Problems

A known drill reamer, as an example of the boring tool of the type mentioned above, is shown in FIGS. 4 to 8. This drill reamer has tool body 1 which has a rectangular cross-section taken along the axis thereof. A pair of chip discharge flutes 2, 2, each having a V-shaped cross-section, are formed in the side surface of the tool body 1 so as to extend linearly from the front end to the rear end of the tool body. The edge line where the wall surface of each flute 2 facing forwardly in the rotation direction intersects the end relief surface forms an end cutting edge 3, while the edge line where the above-mentioned wall surface intersects an outer peripheral margin forms an outer peripheral cutting edge 5. In this drill reamer, the drill end portion on the trailing side of the outer peripheral margin 4 is cut to provide a flat land portion 6 and a second margin 7 is formed on the trailing side of the land portion 6.

This drill reamer exhibits a high degree of rigidity by virtue of the fact that the chip discharge flutes 2, 2 are straight. In addition, since the drill reamer is guided by four margins, vibration is effectively suppressed during drilling, thus offering a high level of machining precision.

FIGS. 9 and 10 show a different known drill reamer of the type which is disclosed in Japanese Utility Model Laid-Open No. 57-100419. This drill reamer has a pair of first chip discharge flutes 11 formed in the outer peripheral surface. A second chip discharge flute 13 and a third chip discharge flute 14 are arranged in the mentioned order in the direction of rotation in each of lands 12 defined between the pair of first chip discharge flutes 11. A rough cutting edge 11a, a medium-finish cutting edge 13a, and a finish cutting edge 14a are formed on the edge lines where the end relief surface meets the forwardly facing wall surfaces of the first, second, and third chip discharge flutes 11, 13 and 14, respectively. These cutting edges have different diameters which increase in a stepped manner.

It is said that in this type of drill reamer, the boring load is shared by the plural cutting edges so that the burden on each cutting edge, i.e., the amount of the metal to be removed during cutting by each cutting edge, is reduced, which effectively improves precision of the boring, as well as improving the surface roughness, while extending the life of the cutting edge.

However, these known drill reamers suffer from the following disadvantages. Namely, the drill reamer of the first-mentioned type is liable to generate much heat due to friction between the outer peripheral margins and the bore wall, because the number of the outer peripheral margins is as large as four. In addition, the chips of the cut metal tend to be introduced to the second margin because the lands are flattened. Consequently, the cut metal chips tend to be caught between the second margin and the bore wall so as to be welded therebetween, thus roughening the finished surface and increasing the power required for the drilling.

In the drill reamer of the second-mentioned type, the total cutting resistance is greater than that produced by two-edged drills because it has many, i.e., six, cutting edges. On the other hand, only two margins are available for guiding the tool body during the cutting. Consequently, the tool body is liable to vibrate. In addition, only a pair of cutting edges, more specifically the finish cutting edges 14a, 14a, take part in the finishing of the bore, from among six cutting edges on the drilling reamer. Consequently, there is a practical limit in the improvement in the boring precision and in the fineness of the finished surface.

SUMMARY OF THE INVENTION

The present invention has been accomplished to overcome the above-described problems of the known boring tools. It is, therefore, an object of the present invention to provide a boring tool which prevents welding of cut metal chips and which can be stably guided during drilling, while offering an improvement in the dimensional precision of the drilled bore and in the fineness of the finished surface.

The boring tool in accordance with the present invention comprises a tool body which has a pair of chip discharge flutes formed in the peripheral surface thereof. A cutting edge is formed on the edge line where the end relief surface of the tool body intersects the wall surface of each chip discharge flute which faces forwardly in the direction of the tool rotation. A first margin is provided on the end of the land which is on the trailing side of the flute from the tool rotation direction, while a second margin is provided on the end of the land adjacent to the heel. The lands are provided with recesses, the depths of each of which progressively increase from the first margin towards the second margin. A sub-cutting edge is formed on the edge line where the end relief surface meets the wall surface of the recess which faces forwardly in the direction of the tool rotation. Alternatively, there is provided a first outer peripheral cutting edge having an edge outside diameter D1 and, at a location which is retracted by a distance B from the first outer peripheral cutting edge, a second outer peripheral cutting edge which has an outside diameter D greater than the above-mentioned diameter D1, with a first sub-cutting edge and a second sub-cutting edge on the edge lines of these outer peripheral cutting edges. In addition, a chamfered portion can be formed on the edge line where the outer peripheral surface of the second margin intersects the rearwardly facing wall surface of the chip discharge flute, the chamfered portion intersecting the surfaces at obtuse angles and extending along the second margin.

According to the arrangement of the present invention, trapping of the cut metal chips between the margin and the drilled bore surface is suppressed, which avoids roughening of the finished surface attributable to biting of such metal chips. In addition, the tool body is securely guided to exhibit reduced vibration during the drilling, thus improving machining precision, as well as enabling a high degree of fineness of the finished surface.

In a specific form of the invention in which the chamfered portion is provided, a sufficient tool strength is obtained at the portion of the land adjacent of the heel, thus preventing trouble such as fracturing of the portion of the tool which is loaded, or breaking of the whole second margin during the drilling, whereby the life of the tool is extended.

The above and other (a) objects, (b) advantages, (c) features and (d) aspects of the present invention will be more readily perceived from the following description of the preferred embodiments thereof taken together with the accompanying drawings and claims.

BRIEF DESCRIPTION OF THE DRAWINGS

The present invention is illustrated by way of example and not limitation in the accompanying drawings, in which like references indicate like parts, and in which.

DETAILED DESCRIPTION OF THE PREFERRED EMBODIMENTS

A description will now be given of preferred embodiments of the present invention.

Figure 1:
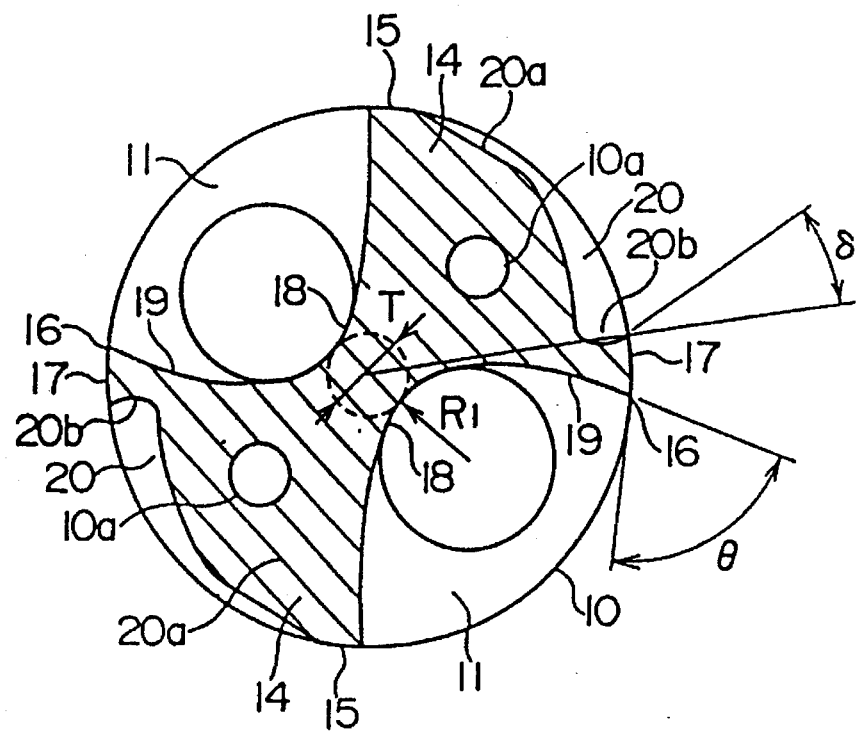
FIG. 1 is a sectional view of a drill according to a first embodiment of the present invention, taken along the axis of the drill of FIG. 2.
Figure 2:
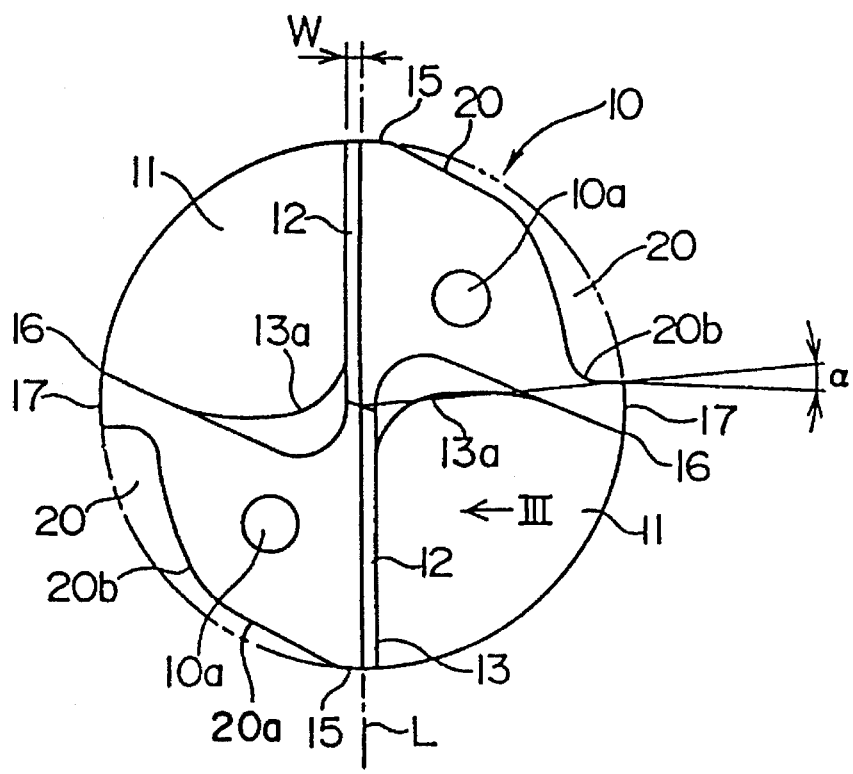
FIG. 2 is a bottom plan view of the drill shown in FIG. 1.
Figure 3:
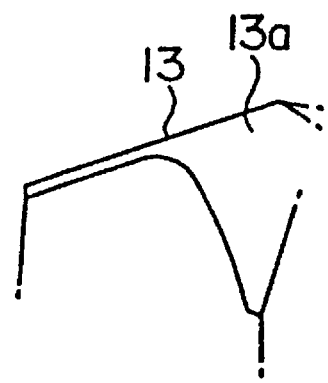
FIG. 3 is an illustration of the drill shown in FIG. 1, as viewed in the direction of arrows III.
Figure 4:
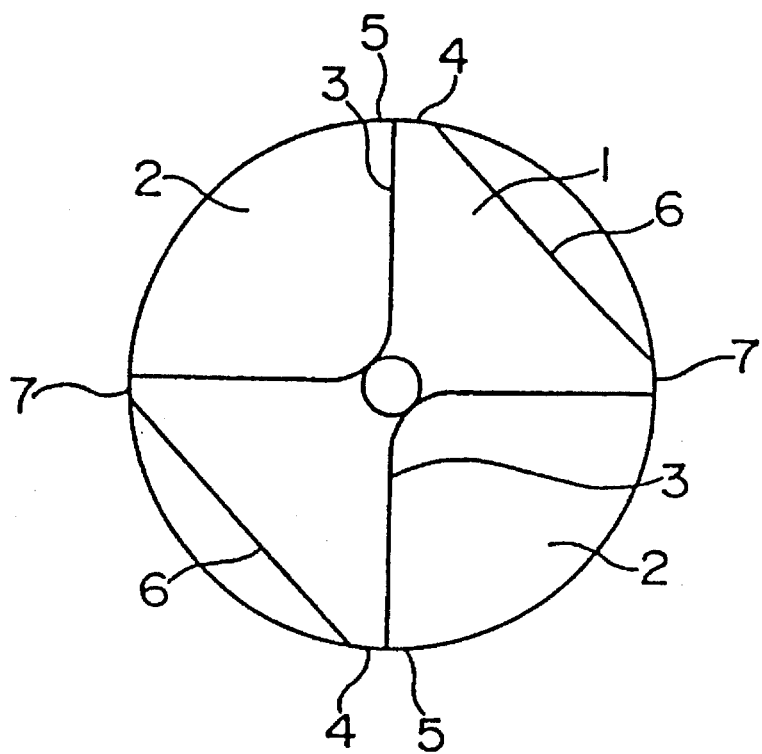
FIG. 4 is a sectional view of a known drill reamer.
Figure 5:
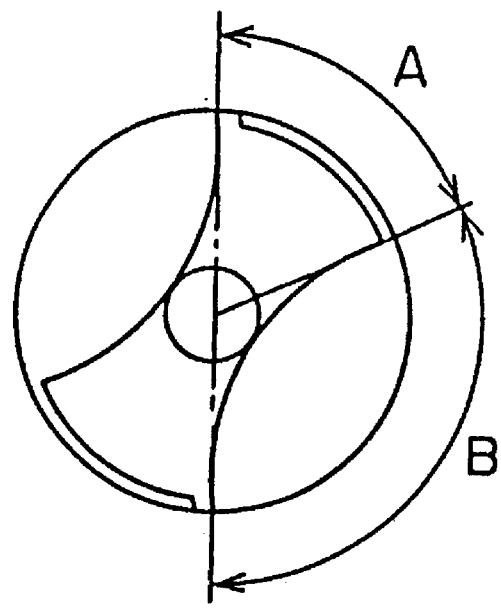
FIG. 5 is a sectional view of a conventional drill.
Figure 6:
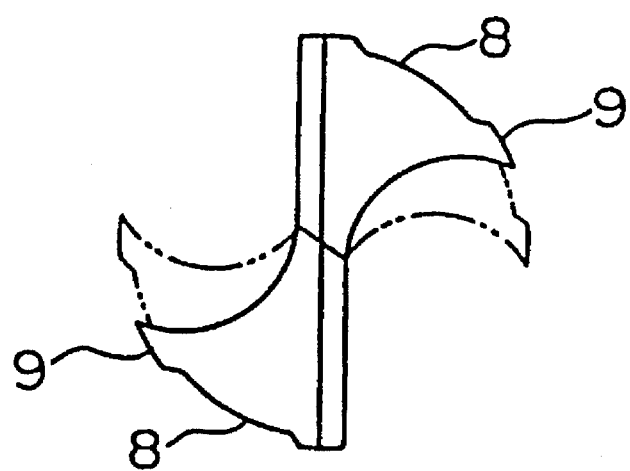
FIG. 6 is a bottom plan view of a known drill having four peripheral margins.
Figure 7:
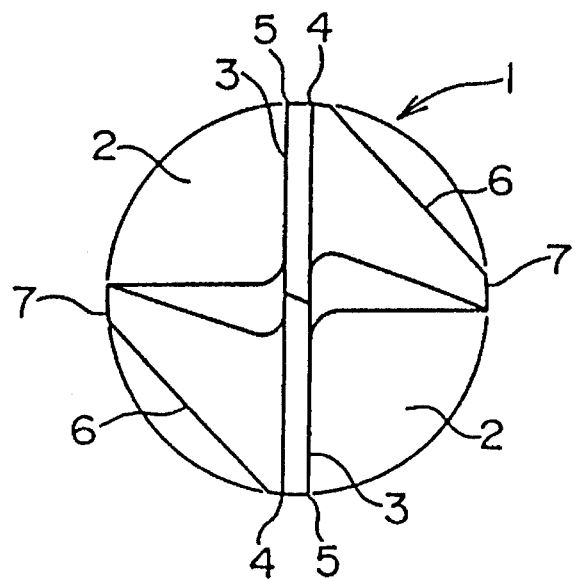
FIG. 7 is a bottom plan view of another known drill.
Figure 8:
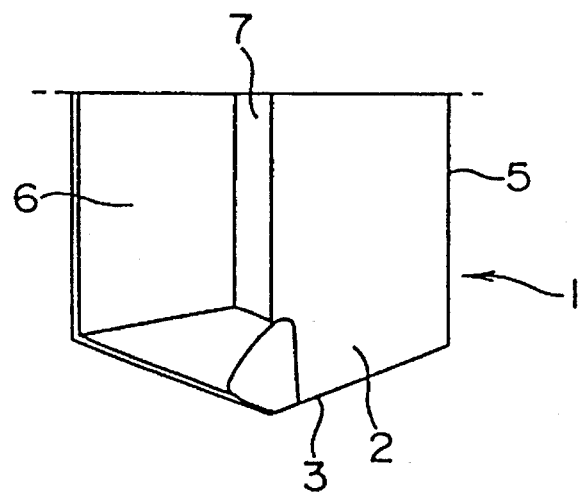
FIG. 8 is a side elevational view of the drill shown in FIG. 7.
Figure 9:
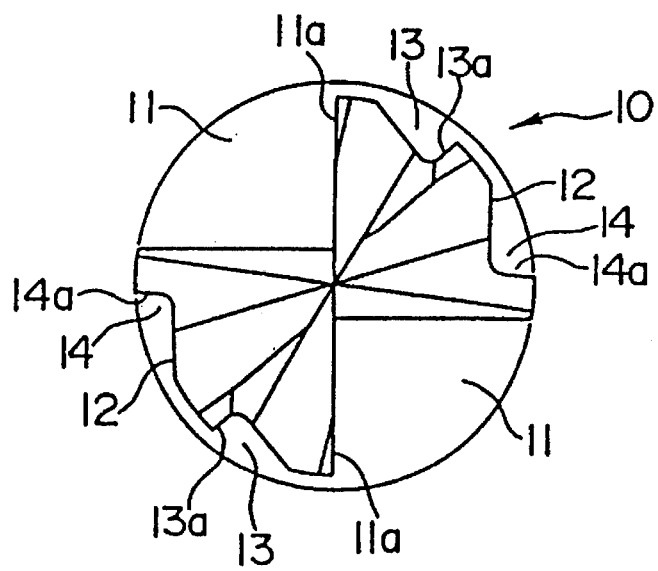
FIG. 9 is a bottom plan view of another known drill.
Figure 10:
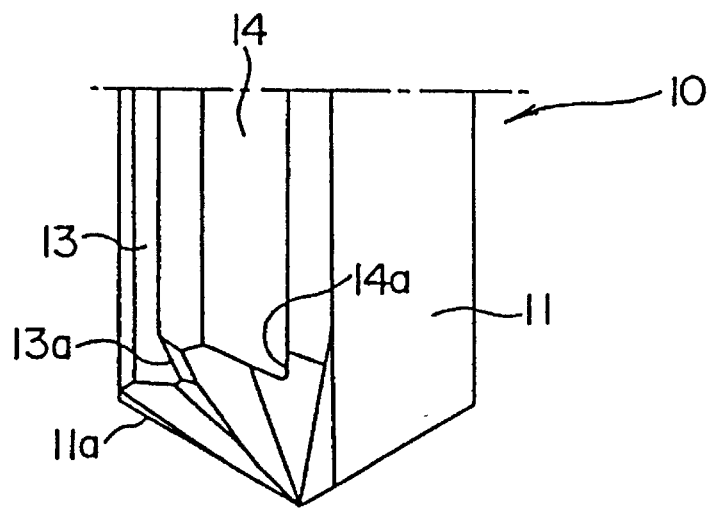
FIG. 10 is a side elevational view of the drill shown in FIG. 9.

FIGS. 1 to 3 show a first embodiment of the present invention. More specifically, FIG. 1 is a sectional view of a drill according to the first embodiment, FIG. 2 is a bottom plan view of the drill of FIG. 1, and FIG. 3 is a side elevational view of the drill shown in FIG. 1. Chip discharge flutes 11 are formed in the outer peripheral surface of a tool body 10 and extending in the direction of axis of the tool body 10. A cutting edge 13 is formed on the edge line where the wall surface of each chip discharge flute facing for- wardly in the direction of the tool rotation meets the end relief surface 12. The cutting edge 13 is straight and, due to a thinning portion 13a formed in the wall which constitutes the core portion, extends to the central region of the drill. The relief surface 12 also is straight and extends from the cutting edge 13 to a central line L which passes the center of drill rotation. The width W of the relief surface 12 is as small as from 0.015 D to 0.10 D (D being the drill diameter). The size of the chisel is correspondingly small. The portion of each land 14 adjacent to the chip discharge flute 11 presents a first margin 15, while the portion of the land 14 adjacent to the heel 16 provides a second margin 17. The angle formed between these margins 15 and 17 about the axis preferably falls between 80° and 100°.

The core thickness T is determined to be from 0.1 D to 0.2 D. The innermost or bottom portion of each flute 11, extending over a certain length including the portion which provides the core thickness T, presents a part of a cylindrical surface 18 of a radius R which ranges between 0.1 D and 0.3 D. The wall of the flute between the end of the cylindrical surface 18 and the heel 16 also presents a part of another cylindrical surface 19 which is recessed forwardly in the direction of rotation. The angle Θ formed between the cylindrical surface 19 and a line tangent to the second margin 17 is determined to be from 60° to 80°. Numeral 10a denotes oil passage bores formed in the tool body 10.

A recess 20 is formed in each land portion 14 of the tool body 10. Each recess 20 includes (a) a convex curved surface portion 20a which extends from the first margin towards the second margin so as to progressively increase its depth and (b) a deepest concave curved surface portion 20b which is adjacent to the second margin 17. The end portion of the convex curved surface portion 20a adjacent the first margin has a large radius of curvature and, hence, is substantially flat. When the chip discharge flute 11 is formed as a straight flute, this portion of the convex curved surface portion 20a may be completely flat. In addition, the boundary between the concave curved surface portion 20b and the second margin 17 when viewed in bottom plan view presents an obtuse angle, so as to prevent fracturing of the tool at this boundary portion. To explain in more detail, the angle α, shown in FIG. 2, formed between the straight line connecting the axis of rotation of the tool body 10 to the point where the concave curved surface portion 20b and the second margin 17 intersect each other and a line tangent to the concave curved surface portion 20 at the above-mentioned point of intersection is set to range from 0° to 20°. On the other hand, in regards to the cross-section, the angle δ, shown in FIG. 1, formed between the straight line connecting the axis of rotation of the tool body 10 to the point where the concave curved surface portion 20b and the second margin 17 intersect each other and the line tangent to the concave curved surface portion 20b at the above-mentioned point of intersection is determined to range between −5° and 20°. Preferably, the angle δ is a positive angle: namely, the angle formed between the concave curved surface portion 20b and the second margin 17 is an acute angle. By setting the above-mentioned angle δ to a positive angle, it is possible to suppress the tendency for the cut metal chips to be caught between the second margin 17 and the wall surface of the drilled bore.

In the twist drill having the described construction, the depth of the recess 20 progressively increases towards the second margin 17, so that the chips of the cut metal are allowed to flow easily into the deepest portion of the recess 20, i.e., into the concave curved surface portion 20b, in accordance with the rotation of the tool. The metal chips temporarily stay in this portion and are then discharged without delay towards the base end of the tool by the function of the chip discharge flutes 11. Thus, introduction of the cut metal chips to the region between the second margin 17 and the drilled surface of the bore is suppressed so as to prevent trouble such as roughening of the finished surface which otherwise may occur due to biting of the cut metal chips. In addition, the tool body 10 can be guided stably during the drilling by virtue of the fact that the margins 15 and the margins 17 are alternately arranged at an equal interval in the circumferential direction. Consequently, vibration of the tool body 10 is reduced to improve precision factors such as the tolerance of the bore size, the circularity, and the degree of fineness of the machined surface. Furthermore, the tool of the present invention can suitably be used in the drilling of bores of large depths because of the large rigidity of the tool offered by the lands which have large widths. The enhanced rigidity makes it possible to reduce the core thickness as described above, which in turn allows the chip discharge flutes 11 to have large cross-sectional areas.

It is to be understood that the present invention is not limited to a drill but may be applied to various other types of boring tools such as an end mill, a drill reamer and so forth.

Figure 11:
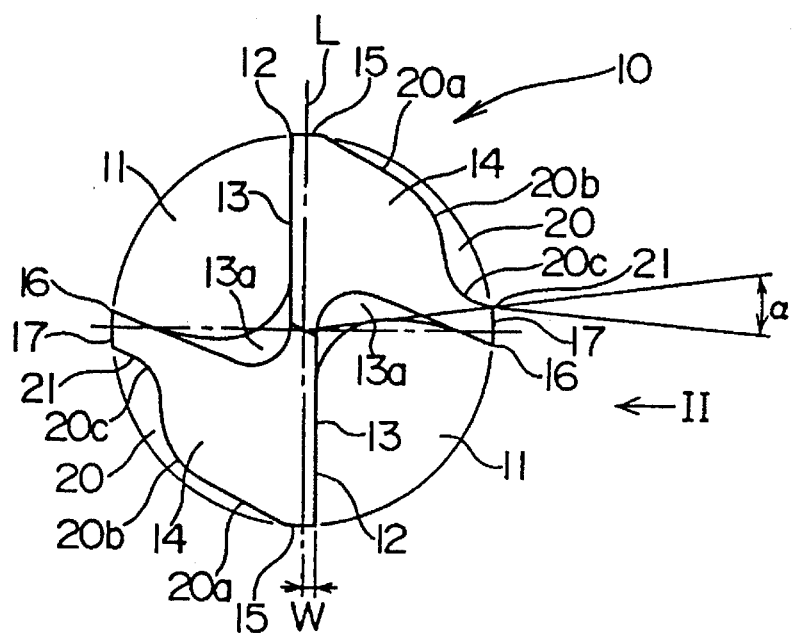
FIG. 11 is a bottom plan view of a drill according to a second embodiment of the present invention.
Figure 12:
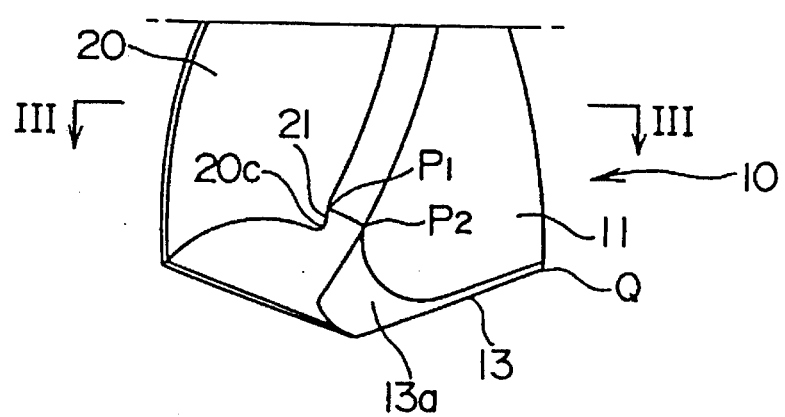
FIG. 12 is a side elevational view of the drill shown in FIG. 11.
Figure 13:
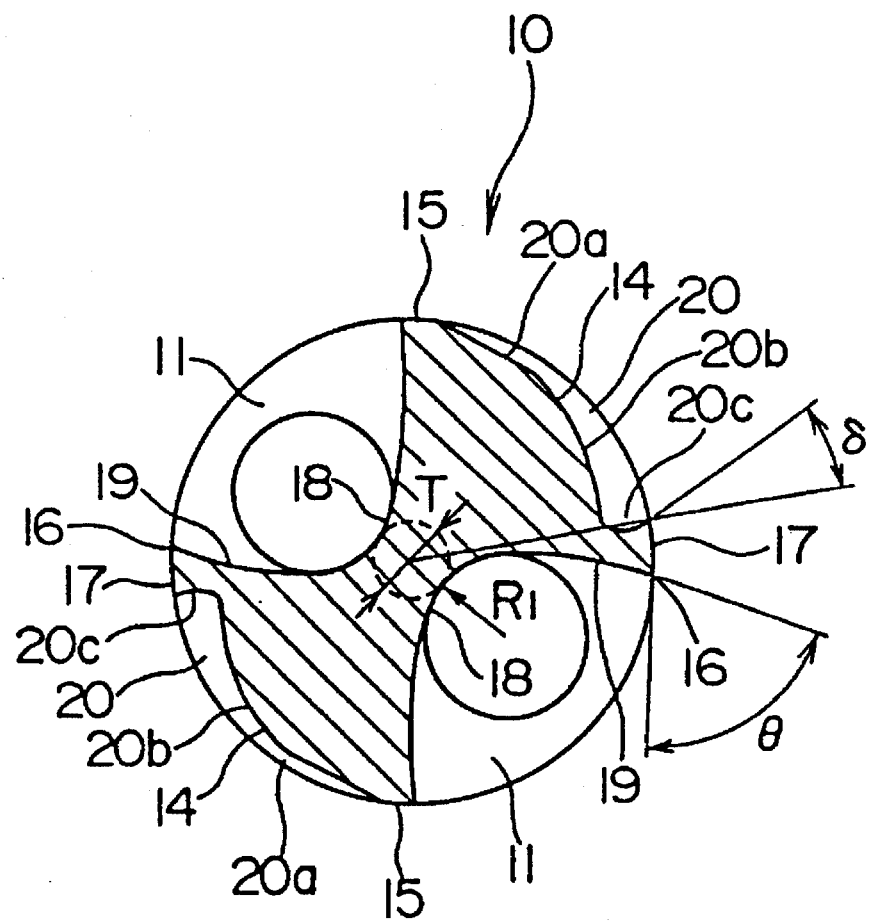
FIG. 13 is a sectional view taken along the line III—III of FIG. 12.

FIGS. 11 to 13 show a second embodiment of the present invention. More specifically, FIG. 11 is a bottom plan view of a drill according to a second embodiment, FIG. 12 is a side elevational view of the drill as viewed in the direction II of FIG. 11, and FIG. 13 is a sectional view taken along the line III—III of FIG. 12.

The second embodiment is distinguished from the first embodiment in that it has sub-cutting edges. More specifically, a sub-cutting edge 21 is formed on an edge line where the end relief surface which presents the second margin 17 intersects the wall surface of the concave curved surface 20b/20c of the recess 20 facing forwardly in the direction of rotation. The role of the sub-cutting edge 21 is to finish the bore which has been cut by the cutting edge 13. The diameter of the sub-cutting edge 21 is equal to that of the cutting edge 13. It is to be understood, as can be seen in FIG. 12, that the end P1 of the end edge line of the second margin 17 is located nearer to the rear end of the tool than the opposite end P2 of the same end edge line.

According to this arrangement, even further, the end edge line P1–P2 of the second margin 17 can function as a finishing edge which finishes the surface of the bore cut by the cutting edge 13. In general, when boring an aluminum work, the bore formed by the cutting edges instantaneously contracts to reduce its diameter, so that the drill diameter has to be determined to compensate for such a reduction in the bore diameter. In contrast, in the drill of the second embodiment of the invention as described, the bore, which has been contracted to reduce its diameter after cutting by the cutting edges 13, is cut again to the final diameter by the sub-cutting edges presented by the end edge lines P1–P2 of the second margin 17, whereby the bore is finally formed in exactly the same diameter as the cutting edge 13. In this drill, since the end edge line P1–P2 is used as the finishing cutting edge, preferably, the end P2 of the edge line P1–P2 adjacent to the tool end is located at a position closer to the base end of the tool than the outer peripheral end Q of the cutting edge 13.

As has been described, the drill as the second embodiment of the present invention offers an advantage in that it substantially eliminates the necessity for the cutting margin which hitherto has been necessary due to contraction which occurs after cutting by the cutting edges 13, because in this drill the contracted bore is again machined finally by the sub-cutting edges presented by the end edge lines P1–P2 of the second margin 17.

Figure 14:
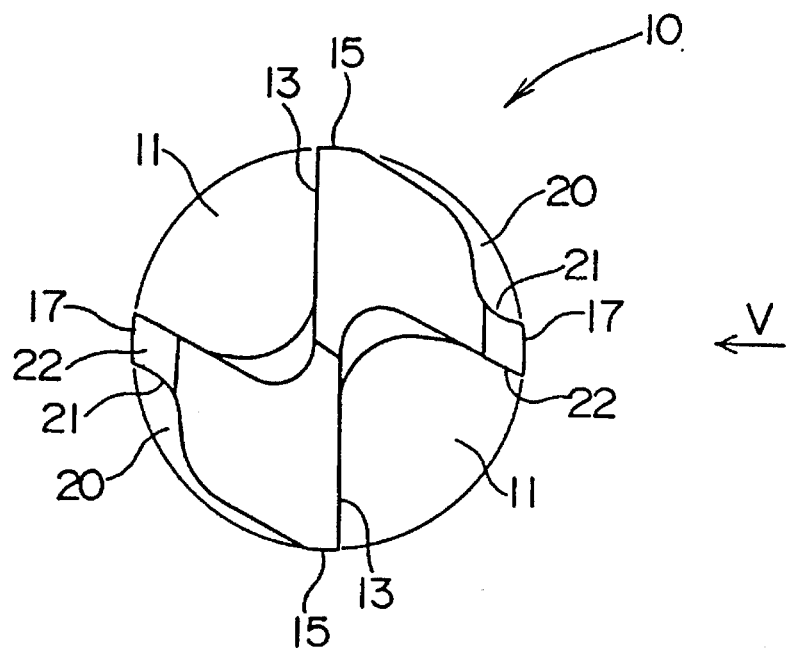
FIG. 14 is a bottom plan view of a drill according to a third embodiment of the present invention.
Figure 15:
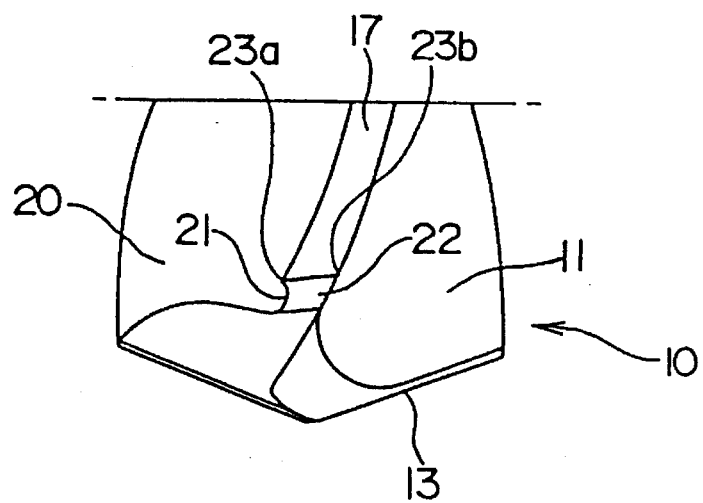
FIG. 15 is a side elevational view of the drill shown in FIG. 14 as viewed in the direction V shown in FIG. 14.

FIGS. 14 and 15 show a third embodiment of the present invention. More specifically, FIG. 14 is a bottom plan view of a drill as the third embodiment, while FIG. 15 is a side elevational view as viewed in the direction V of FIG. 14.

In this third embodiment, the end relief surface which presents the second margin 17 in the second embodiment provides a slant surface 22 which is tapered in the radially outward direction and towards the trailing side. Therefore, the positional relationship between the two edges 23a, 23b on the end of the second margin 17 is such that the edge 23a is located nearer to the free end of the tool than the other edge 23b. During the machining performed by the sub-cutting edge 21, therefore, the edge 23a of the sub-cutting edge 21 is brought into contact with the material to be cut before the edge 23b contacts the cut material. It is, therefore, possible to avoid interference between the edge 23b of the sub-cutting edge 21 with the material which is being machined, thus contributing to improvement in the fineness of the finished surface of the bore.

Figure 16:
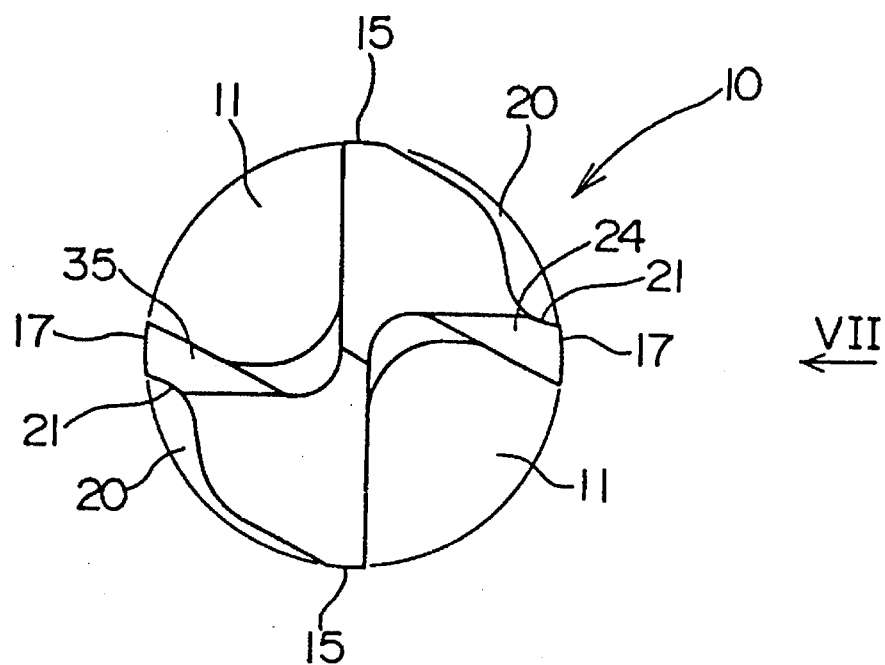
FIG. 16 is a bottom plan view of a drill according to a fourth embodiment of the present invention.
Figure 17:
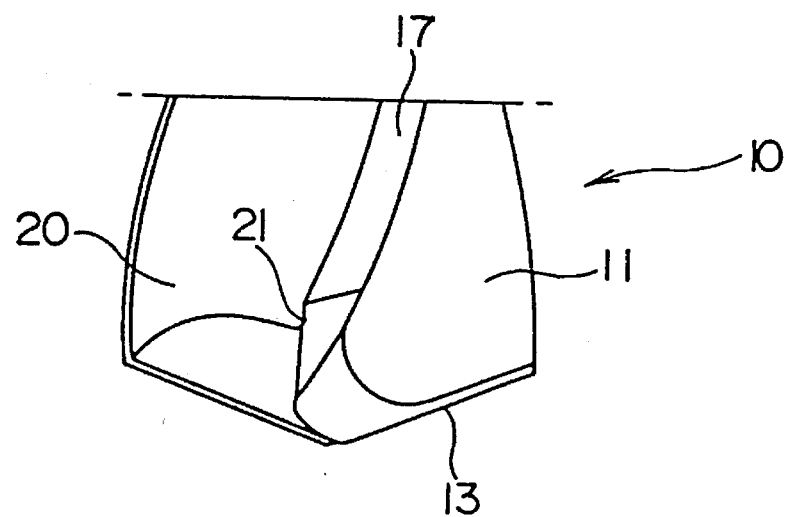
FIG. 17 is a side elevational view of the drill shown in FIG. 16 as viewed in the direction VII shown in FIG. 16.

FIGS. 16 and 17 show a drill as a fourth embodiment which is a modification of the third embodiment described above. This drill has a slant surface 24 which is more largely tapered towards the trailing side than the tapered surface 22 of the third embodiment. This drill provides substantially the same effect as the third embodiment.

Figure 18:
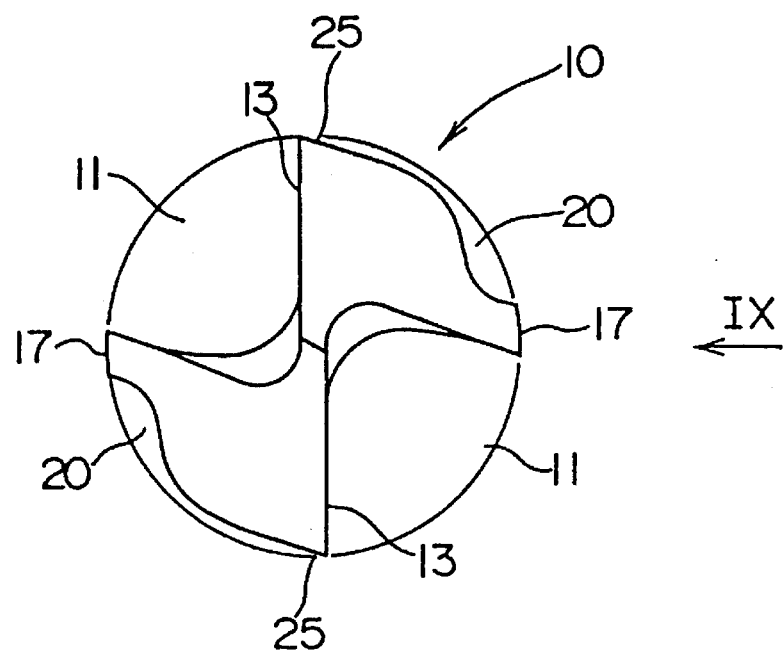
FIG. 18 is a bottom plan view of a fifth embodiment of the present invention.
Figure 19:
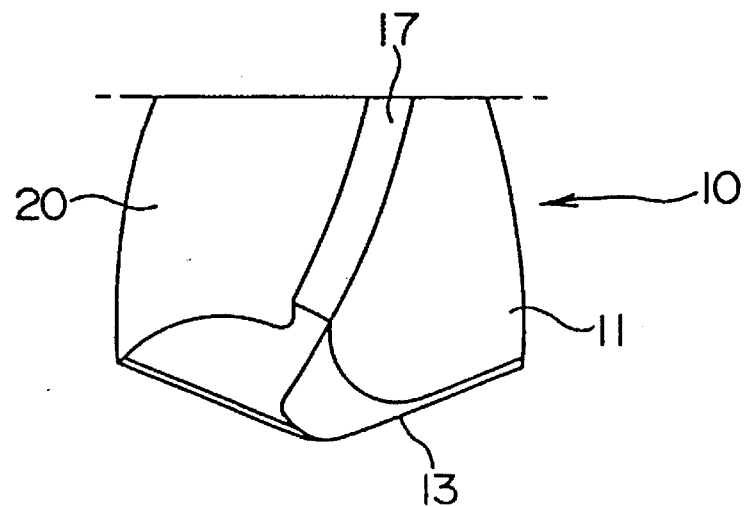
FIG. 19 is a side elevational view of drill shown in FIG. 18 as viewed in the direction of IX shown in FIG. 18.

FIGS. 18 and 19 show a fifth embodiment of the present invention. This embodiment is distinguished from the first embodiment in that the first margin 15 on the drill of the first embodiment is substituted by a relief surface 25 having a predetermined relief angle. In this drill, the friction between the drill and the surface of the bore which is being drilled is reduced by virtue of the relief surface 25 which is formed in place of the first margin. It is, therefore, possible to suppress various types of trouble attributable to the generation of heat from the machined portion, such as the welding of the cut metal chips and contraction of the drilled bore due to thermal shrinkage. As to the guiding of the tool body 10, the vibration occurring in the direction of the main component of the cutting resistance is effectively suppressed by the second margins 17, whereas vibration in the direction perpendicular to the main resistance direction is sufficiently suppressed by the edge of the relief surface 25, so that the guiding performance is not substantially impaired as compared with the first embodiment which employs four margins in total.

Figure 20:
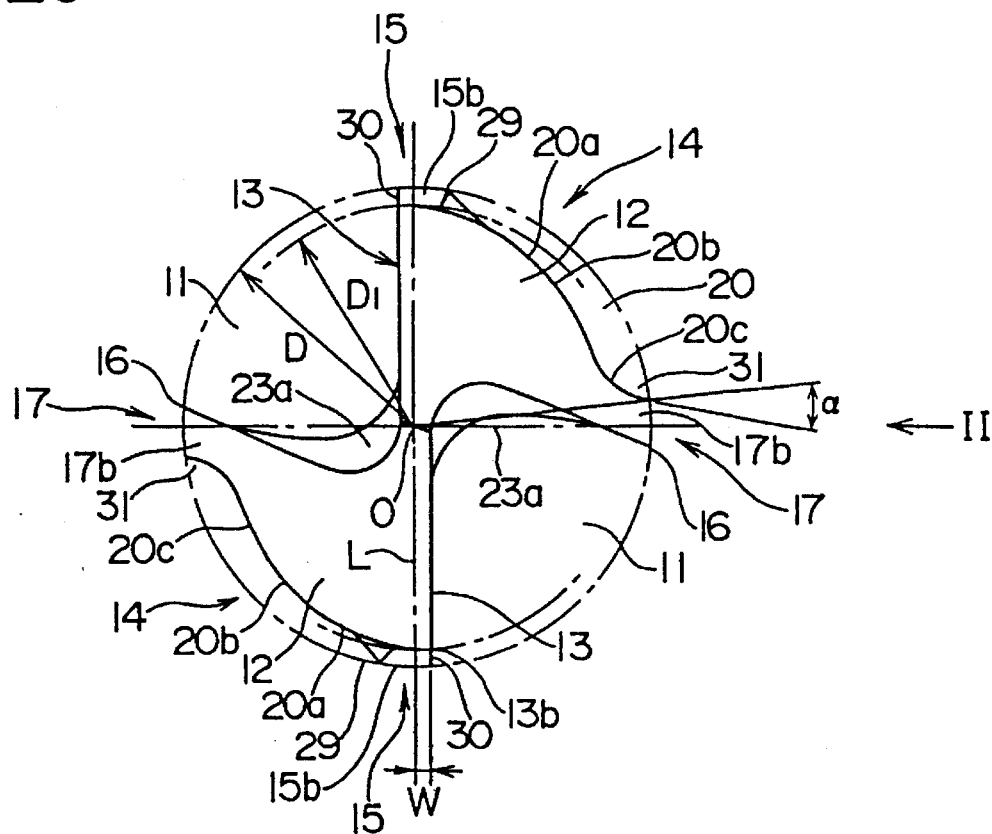
FIG. 20 is a bottom plan view of a drill according to a sixth embodiment of the present invention.
Figure 21:
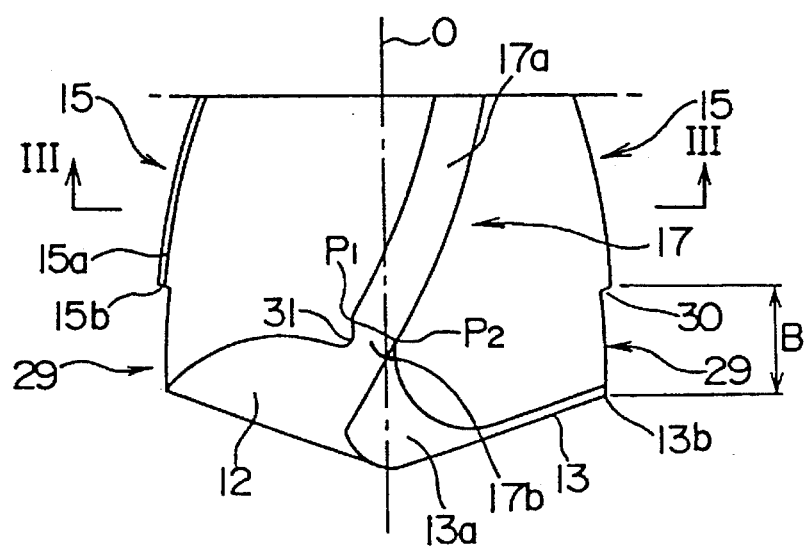
FIG. 21 is a side elevational view of the drill shown in FIG. 20 as viewed in the direction II shown in FIG. 20.
Figure 22:
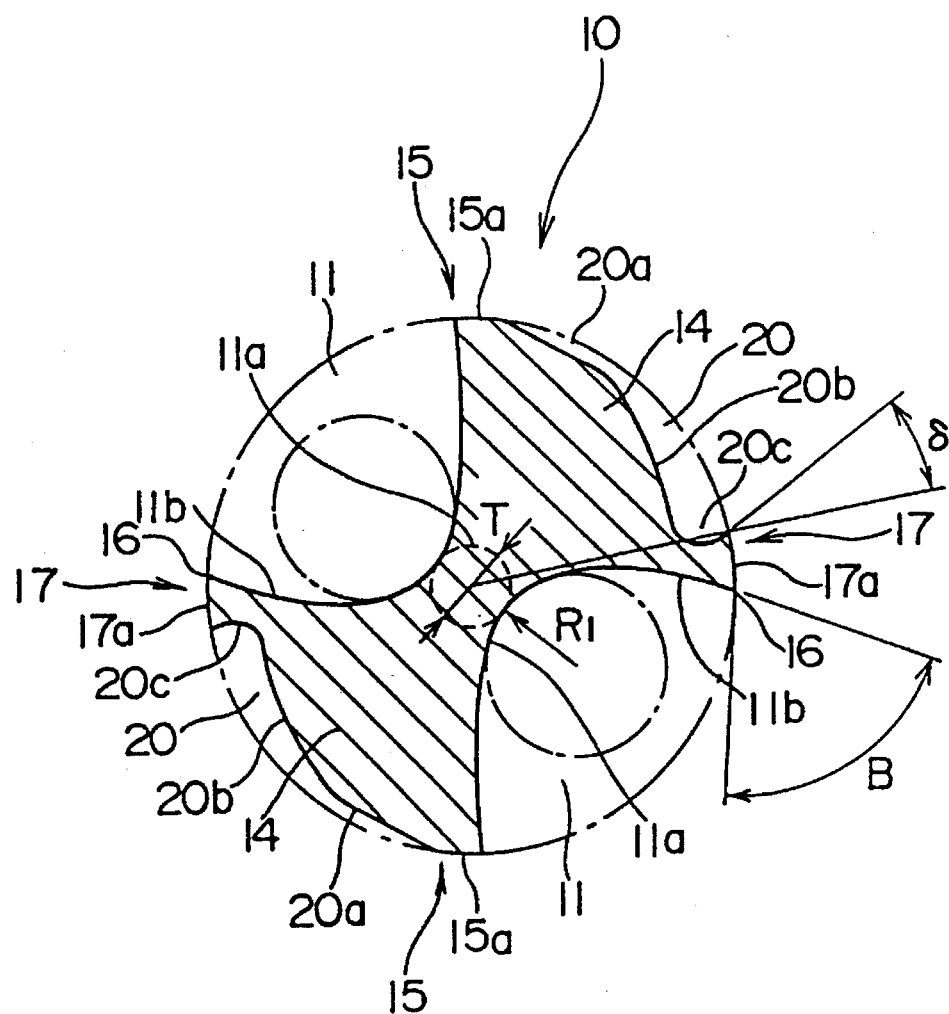
FIG. 22 is a sectional view taken along the line III—III of FIG. 21.

A sixth embodiment of the present invention will be described with reference to FIGS. 20 to 22. More specifically, FIG. 20 is a bottom plan view of a drill according to the sixth embodiment, FIG. 21 is a side elevational view of the embodiment as viewed in the direction II of FIG. 20, and FIG. 22 is a sectional view taken along the line III—III of FIG. 21.

In this drill, the first margin 15 starts from a position which is slightly retracted towards the base end of the tool from the outer peripheral end 13b of the cutting edge 13, so that an outer peripheral portion 29 which is devoid of the margin is formed with respect to the cutting edge 13 at the end of the tool body 10. A relief angle is imparted to this outer peripheral portion 29 towards the trailing side.

A first sub-cutting edge 30 is formed on the edge line at which the end surface 15b of the first margin 15 and the wall surface of the chip discharge flute 11 facing forwardly as viewed in the tool rotation direction meet each other. Consequently, the outside diameter D1 of the cutting edge 13 is slightly smaller than the outside diameter D of the first sub-cutting edge 30 as measured from the axis O, i.e., slightly smaller than the outside diameter of the first margin 15. The outside diameter of the boring tool D means the outside diameter D of the first sub-cutting edge 30. The difference D–D1, between the outside diameter D of the first sub-cutting edge 30 and the outside diameter D1 of the cutting edge 13, is determined to be 5% or less of the outside diameter D of the first sub-cutting edge 30.

In this embodiment, the recess 20 and the second margin 17 are extended to reach the end relief surface 12 of the tool body 10 so that the end surface 17b of the second margin 17 is flush with the end relief surface 12. A second sub-cutting edge 31 is formed on the edge line where the wall surface of the concave curved surface portion 20b/20c of the recess 20 facing forwardly in the tool rotation direction and the end surface 17b of the second margin 17 intersect. Since a relief angle is imparted to the end relief surface 12 toward the trailing side from the tool rotation direction, the sub-cutting edge 31 also is located closer to the tool base end than the outer peripheral end 13b of the cutting edge 13 as is the case of the first sub-cutting edge 30. The second sub-cutting edge 31 is positioned closer to the tool free end than the first sub-cutting edge 30 is. In addition, the second margin 17 is formed to have the same outside diameter as the first margin 15. Consequently, the outside diameter of the second sub-cutting edge 31 also is set to be equal to the outside diameter D of the first sub-cutting edge 30.

In this embodiment, the end surface 17b of the second margin 17 intersects the outer peripheral surface 17a along an edge line P1–P2. The arrangement is such that the end P1 adjacent to the second sub-cutting edge 31 is located closer to the tool base end than the other end P2 is.

In the boring tool having the described construction, vibration of the tool body 10 is avoided because the tool body 10 can stably be guided by the first and second margins 15, 17.

In this embodiment, the dimensional precision, as well as the fineness of the machined surface, is improved because finish cutting is performed by the first and second sub-cutting edges 30, 31 after rough cutting performed by the cutting edge 13. In this embodiment, a pair of first sub-cutting edges 30, 30 and a pair of second sub-cutting edges 31, 31 are employed. Thus, four sub-cutting edges are arranged substantially at a constant spacing in the circumferential direction of the tool body 10, as in the case of the four margins 15, 17. It is, thus, possible to stably effect boring with a high degree of uniformity and a high degree of precision over the entire length of the bore.

In this embodiment, the difference D–D1, between the outside diameter D of the first and second sub-cutting edges 30, 31 and the outside diameter D1 of the cutting edge 13, is determined to be not more than 5% of the outside diameter D. When the difference D–D1 exceeds 5% of the outside diameter D, the amount of the metal to be cut by the first and second sub-cutting edges is drastically increased so that these sub-cutting edges 30, 31 can no longer function as the finish cutting edges.

Fine cut metal chips or dust generated as a result of the cutting performed by the first and second sub-cutting edges 30, 31 are discharged toward the base end of the tool body 10 along the recesses 20, so as to reduce the risk of introducing the cut metal chips, formed by the second sub-cutting edge 31, into the region between the second margin 17 and the surface of the bore which is being drilled, whereby problems, such as welding of the metal chips to the bore surface, are avoided. Furthermore, in the illustrated embodiment, the depth of the recess 20 progressively decreases towards the second margin 17 so that the powder or dust of the cut metal is allowed to smoothly move along the recess 20 into the deepest portion, i.e., the concave curved surface portion 20b/20c of the recess 20, in accordance with the rotation of the tool and is efficiently discharged therefrom towards the base end of the tool together with the chips of the cut metal. It is, therefore, possible to more effectively prevent invasion into the region between the second margin 17 and the surface of the drilled bore, thus preventing trouble, such as roughening of the finished surface, due to welding of the metal dust.

Furthermore, in the illustration embodiment, the second sub-cutting edge 31 is positioned closer to the tool end than the first sub-cutting edge 30 is, so that the finish cutting is performed mainly by the second sub-cutting edge 31. As a result, the amount of the cut metal chips generated by the first sub-cutting edge 30 and flowing into the chip discharge flute 11 is reduced, thus eliminating trouble, such as clogging with the cut metal chips, which hitherto has occurred due to interference between the cut metal chips generated by the first sub-cutting edge 30 and introduced into the chip discharge flute and the metal chips which also flow into the flute 11 after being formed by the cutting edge 13.

In this embodiment, the end P1 of the end edge line of the second margin 17 adjacent to the second sub-cutting edge 31 is located closer to the tool base end than the opposite end P2 is. With this arrangement, it is possible to use the end edge line P1–P2 of the second margin 17 as the finish edge for finishing the surface of the drilled bore.

In general, in drilling a bore in an aluminum material, the bore drilled by the cutting edges instantaneously contracts to reduce its diameter immediately after the drilling, so that the drill diameter has had to have been selected to compensate for such a reduction in the bore diameter due to contraction. In contrast, in this embodiment, the bore which has contracted after being drilled by the cutting edge 13 and finished by the second sub-cutting edge 31 is scraped by the end edge line P1–P2 of the second margin 17 to a diameter substantially equal to the outside diameter D of the second sub-cutting edge 31. This substantially eliminates the necessity for the compensation for the reduction in the bore size. A similar arrangement may be adapted on the end of the first margin 15 which is closer to the tool base than the second margin 17. Such an arrangement further enhances the machining precision of the bore.

In this embodiment, the end surface 17b of the second margin 17 is connected to the end relief surface 12 of the tool body 10. The end surface 17b, however, may be formed as a slant surface which is tapered radially outward and towards the trailing side from the direction of the tool rotation. According to this arrangement, the leading end P1, of the end edge line P1–P2 of the second margin 17, is brought into contact with the work which is being machined before the other end P2, of the end edge line P1–P2, is brought into contact with the work, which eliminates interference between the end P2 and the work so as to improve the fineness of the finished bore surface.

In this embodiment, the outer peripheral surfaces 15a, 17a of the first and second margins 15, 17 are formed on a cylindrical surface which is centered at the axis O of the tool body 10. This, however, is only illustrative and a predetermined relief angle may be imparted to the outer peripheral surface 15a of the first margin 15. With this arrangement, friction between the drilled bore and the tool is reduced so as to suppress various undesirable effects which are caused by the generation of heat at the machined portion, such as welding of the cut metal chips, concentration of the bore after the machining, and so forth.

As to the guiding characteristics, vibration in the direction of the main component of the cutting resistance is suppressed by the second margin 17, while the vibration in the direction of the component perpendicular to the main resistance component can be sufficiently suppressed by the first margin 15, even when the latter has a relief angle, because this vibration is not so large. Consequently, the guiding performance is not substantially eliminated as compared with the case where four margins are employed.

Figure 23:
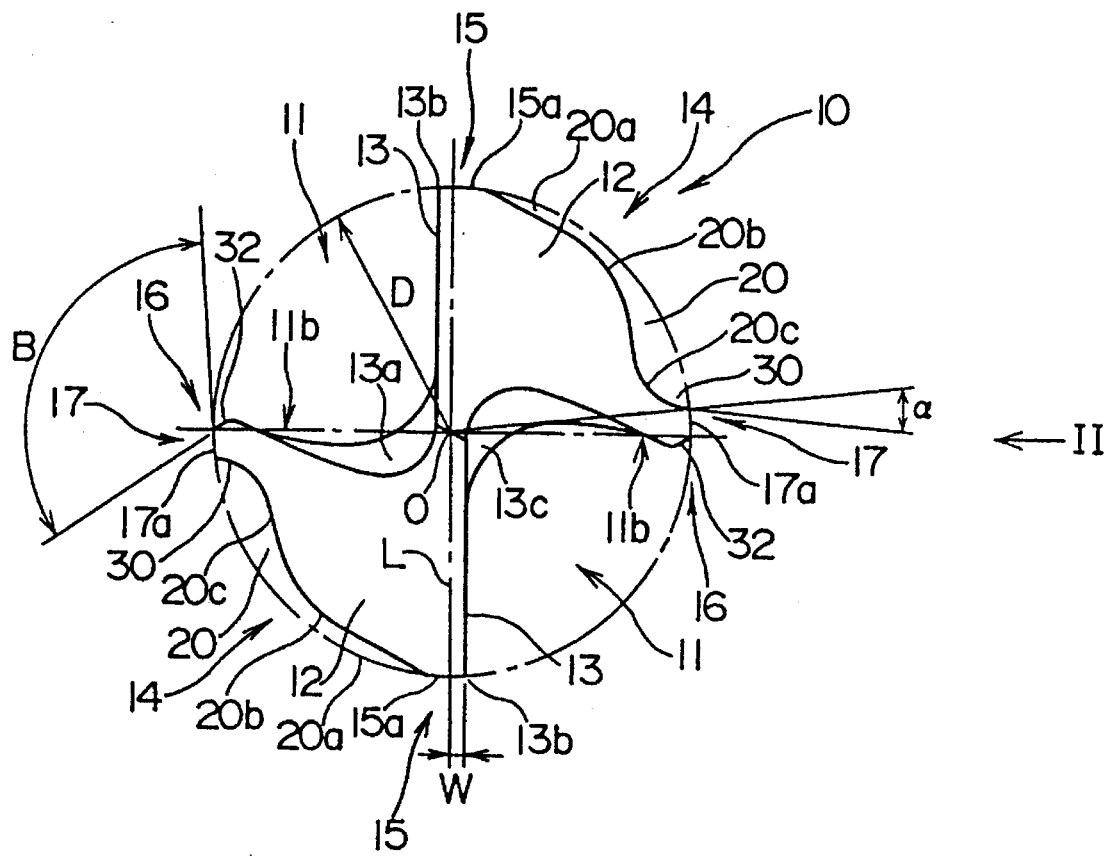
FIG. 23 is a bottom plan view of a drill according to a seventh embodiment of the present invention.
Figure 24:
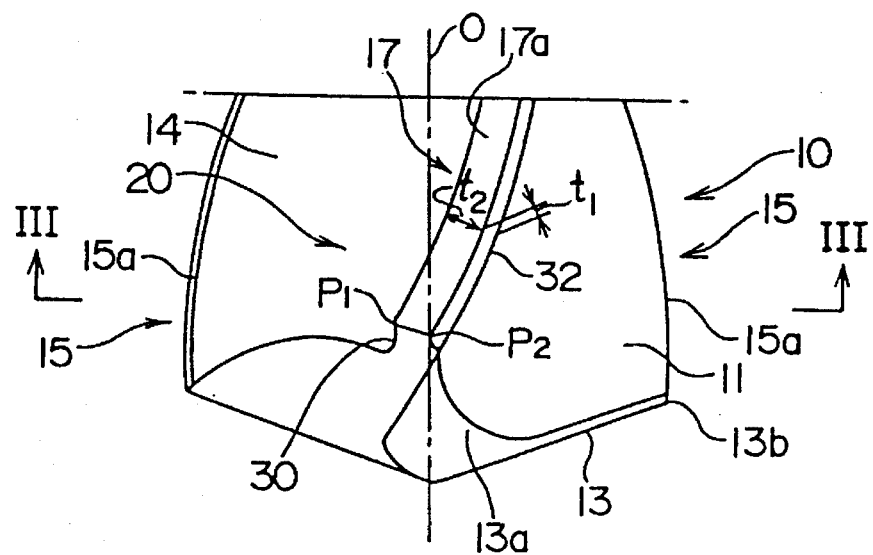
FIG. 24 is a side elevational view of the drill shown in FIG. 23 as viewed in the direction II shown in FIG. 23.
Figure 25:
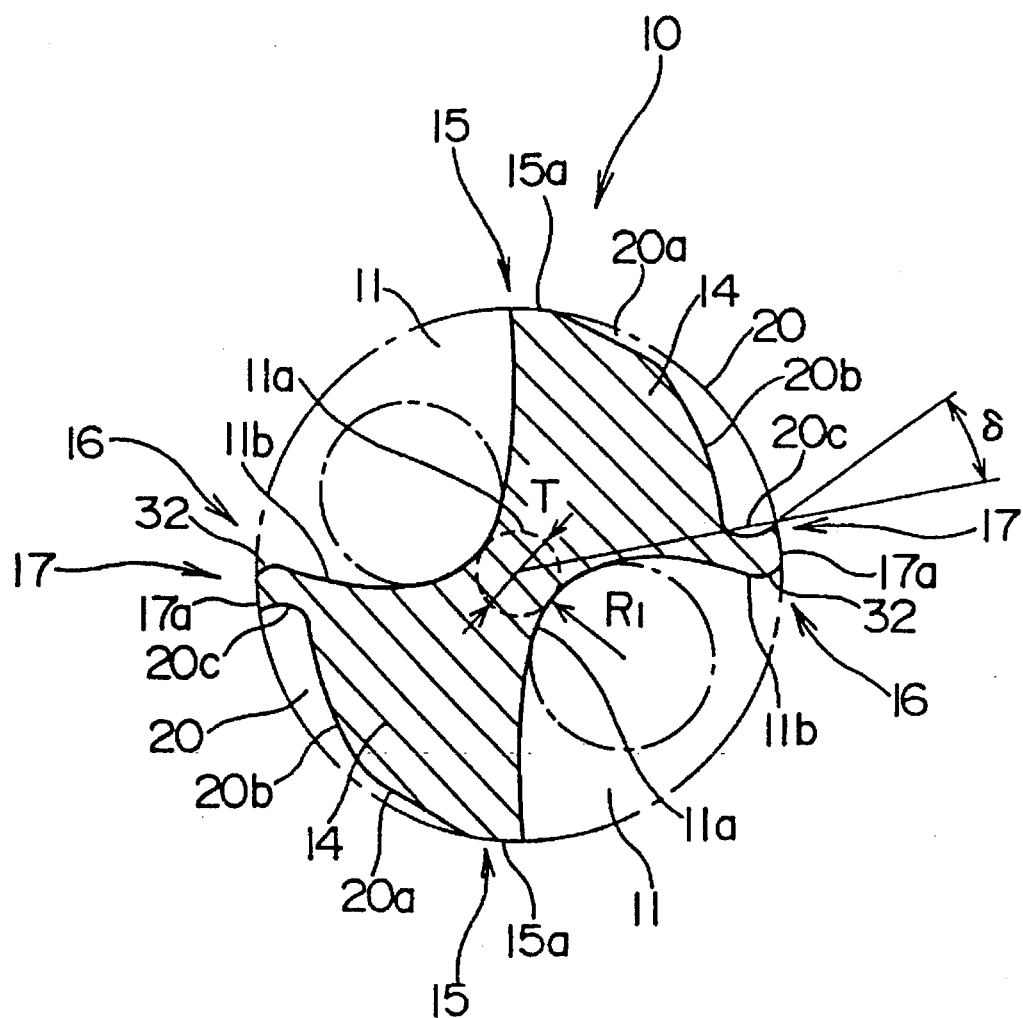
FIG. 25 is a sectional view taken along the line III—III of FIG. 23.

A seventh embodiment of the present invention will be described with reference to FIGS. 23 to 25. FIG. 23 is a bottom plan view of the seventh embodiment, FIG. 24 is a side elevational view as viewed in the direction II shown in FIG. 23, and FIG. 25 is a sectional view taken along the line III—III of FIG. 24.

In this embodiment, a chamfered portion 32 is formed on the edge line where the outer peripheral surface 17a of the second margin 17 and the wall surface 11b of the chip discharge chute 11 facing forwardly in the direction of tool rotation intersect each other. The chamfered portion 32 intersects both the outer peripheral surface 17a and the wall surface 11b at obtuse angles. The chamfered portion 32 extends along the second margin 17 from the end relief surface 12 of the tool body towards the base end of the tool. The angle Θ formed between the chamfered portion 32 and the outer peripheral surface 17a of the second margin 17 is determined to fall within the range from 90° to 120°. The width t1 of the chamfered portion 32 is determined in relation to the width t2 of the outer peripheral surface 17a of the second margin 17 such as to fall within the range of from about 0.1× t2 to 0.5×t2.

By providing this chamfered portion 32, it is possible to reduce the width t2 of the outer peripheral surface 17a of the second margin 17, i.e., the area of this outer peripheral surface 17a, while maintaining the circumferential thickness of the second margin 17 left unchanged. The second margin 17 has a function to guide the tool body 10, as the outer peripheral surface 17a thereof makes sliding contact with the surface of the bore during the drilling. Therefore, the reduction in the area of the outer peripheral surface 17a making sliding contact with the bore surface correspondingly reduces the frictional force applied to the tool body by the surface of the bore, thus reducing the load acting on the second margin 17 during the drilling.

Therefore, the boring tool of this embodiment makes it possible to reduce the load applied to the second margin 17 during the drilling while maintaining the wall thickness of the second margin 17, thus preventing breakdown of the second margin 17 which otherwise may be caused by application of a large load during the drilling. It is, thus, possible to effectively extend the life of the tools, particularly tools of small diameters which often suffer from insufficiency of strength at the second margin 17.

Needless to say, the present invention is not limited to the twist drills such as those of the described embodiments but may be applied to various types of boring tools such as drills having straight flutes, end mills and drill reamers. By applying TiC, TiN or diamond coating to the portions which suffer from specifically heavy wear, it is possible to improve lubrication between the margins and the surface of the bore which is being drilled, as well as to improve the wear resistance.

In the illustrated embodiments, the cutting edges 13 and the sub-cutting edges 21 are directly formed on the tool body 10. Such embodiments, however, are only illustrative and may be modified in various forms. For instance, an ultra-hard sintered material, mainly composed of diamond or CBN (cubic boron nitride) can be bonded by brazing to the portions of the tool body which are to provide cutting edges and sub-cutting edges. And, such sintered material can be used as the material of the cutting edges and the sub-cutting edges. By using such a construction, it is possible to further improve the wear resistance at edge portions where the wear is specifically heavy.

It will be apparent to those skilled in the art that the embodiments described may be varied as discussed above and in other manners, such as to meet particular specialized requirements, without departing from the true spirit and scope of the invention as claimed.

What is claimed:

1. A boring tool, comprising:
    a tool body rotatable about an axis in a tool rotation direction;
    a pair of chip discharge flutes formed in the outer peripheral surface of said tool body;
    cutting edges formed on edge lines where the wall surfaces of said flutes facing forwardly in the tool rotation direction intersect end relief surfaces of said tool body;
    a pair of lands formed on the trailing sides of the respective chip discharge flutes from the direction of tool rotation;
    first margins formed on ends of the respective lands adjacent to the respective chip discharge flutes;
    second margins formed on ends of the respective lands adjacent to heels thereof;
    said first and second margins being arranged substantially at a constant spacing in the circumferential direction of said tool body; and
    recesses formed in the respective lands with the depth of each recess progressively increasing from the first margin towards the second margin of the associated land, said recesses including convex curved surface portion (20a) and a concave curved surface portion (20b).

2. A boring tool according to claim 1, wherein the angle formed between said recess and said second margin as viewed from the axial free end of said tool is an obtuse angle, and the angle formed between said recess and said second margin as viewed in the cross-section of said tool body is an acute angle.

3. A boring tool, comprising:
    a tool body rotatable about an axis in a tool rotation direction;
    a pair of chip discharge flutes formed in the outer peripheral surface of said tool body;
    cutting edges formed on edge lines where wall surfaces of said flutes facing forwardly in the tool rotation direction intersect end relief surfaces of said tool body;
    a pair of lands formed on the trailing sides of the respective chip discharge flutes from the direction of tool rotation;
    first margins formed on the ends of the respective lands adjacent to the respective chip discharge flutes;
    second margins formed on the ends of the respective lands adjacent to heels thereof;

said first and second margins being arranged substantially at a constant spacing in the circumferential direction of said tool body;

recesses formed in respective lands with the depth of each recess progressively increasing from the first margin towards the second margin of the associated land, said recesses including a convex curved surface portion (20a) and a concave curved surface portion (20b); and sub-cutting edges formed on the edge lines at which the end relief surfaces of said tool body intersect the wall surfaces of said recesses facing forwardly in the direction of rotation of said tool.

4. A boring tool according to claim 3, wherein said second margin has an outer peripheral surface which is a part of a cylindrical surface and said first margin is a relief surface having a predetermined relief angle.

5. A boring tool according to claim 3 or 4, wherein the end relief surface of said second margin is a slant surface which is tapered radially outwardly and towards the trailing side from the direction of the tool rotation.

6. A boring tool according to claim 3 or 4, wherein the trailing end edge of said second margin from the direction of the tool rotation is located at a position which is closer to the base end of said tool than the outer peripheral end of said cutting edge.

7. A boring tool according to claim 5, wherein the trailing end edge of said second margin from the direction of the tool rotation is located at a position which is closer to the base end of said tool than the outer peripheral end of said cutting edge.

8. A boring tool, comprising:

a tool body rotatable about an axis in a direction of tool rotation;

a pair of chip discharge flutes formed in the outer peripheral surface of said tool body so as to leave a pair of lands therebetween;

a pair of recesses formed in said lands;

cutting edges formed on edge lines where wall surfaces of the chip discharge flutes facing forwardly in the direction of tool rotation intersect the end relief surfaces;

first margins formed on the ends of the lands adjacent to and on the trailing side of the respective cutting edges, each said first margin being positioned closer to the tool base end than said cutting edge and having an outside diameter greater than that of said cutting edge;

second margins formed on the ends of said land adjacent to heels thereof, said second margin being connected to said end relief surfaces and having the same outside diameter as said first margin;

first sub-cutting edges formed on the edge lines where the wall surfaces of said chip discharge flutes facing forwardly in the direction of tool rotation intersect the end surfaces of said first margins; and second sub-cutting edges formed on the edge lines where the wall surfaces of said recesses facing forwardly in the direction of tool rotation intersect the end surfaces of said second margins, said second sub-cutting edges being positioned closer to the tool free end than said first sub-cutting edges.

9. A boring tool, comprising:

a tool body rotatable about an axis in a direction of tool rotation;

a pair of chip discharge flutes formed in the outer peripheral surface of said tool body so as to leave a pair of lands therebetween;

cutting edges formed on edge lines where the wall surfaces of said chip discharge flutes facing forwardly in the direction of tool rotation intersect the end relief surfaces;

first margins provided on the ends of said lands adjacent to and on the trailing side of said chip discharge flutes from the direction of tool rotation;

second margins provided on the ends of said lands adjacent to heels thereof and having the same outside diameter as said first margins;

said first and second margins being disposed substantially at an equal spacing in the circumferential direction;

recesses formed in said lands positioned adjacent to said second margins and extending from the free end towards the base end of said tool;

sub-cutting edges formed on the edge lines where the wall surfaces of said recesses facing forwardly in the tool rotation direction intersect the end relief surfaces; and chamfered portions formed on the edge lines where the outer peripheral surfaces of said second margins intersect the wall surfaces of said chip discharge flutes facing rearward from the direction of tool rotation, so as to form obtuse angles to said outer peripheral surfaces and said rearwardly facing wall surfaces.

10. A boring tool according to claim 1, wherein said chip discharge flutes and said recesses are twisted.

11. A boring tool according to claim 3, wherein said chip discharge flutes and said recesses are twisted.

12. A boring tool according to claim 8, wherein said chip discharge flutes and said recesses are twisted.

13. A boring tool according to claim 9, wherein said chip discharge flutes and said recesses are twisted.

14. A boring tool according to claim 1, wherein said chip discharge flutes and said recesses are straight.

15. A boring tool according to claim 3, wherein said chip discharge flutes and said recesses are straight.

16. A boring tool according to claim 8, wherein said chip discharge flutes and said recesses are straight.

17. A boring tool according to claim 9, wherein said chip discharge flutes and said recesses are straight.

18. The boring tool according to claim 1, wherein said convex curved surface portion extends from said first margin towards said second margin so as to progressively increase in depth and said concave curved surface portion is adjacent said second margin.

19. The boring tool according to claim 3, wherein said convex curved surface portion extends from said first margin towards said second margin so as to progressively increase in depth and said concave curved surface portion is adjacent said second margin.

* * * * *